United States Patent
Chauvel et al.

(10) Patent No.: US 7,634,643 B2
(45) Date of Patent: Dec. 15, 2009

(54) STACK REGISTER REFERENCE CONTROL BIT IN SOURCE OPERAND OF INSTRUCTION

(75) Inventors: Gerard Chauvel, Antibes (FR); Serge Lasserre, Frejus (FR); Dominique D'Inverno, Villeneuve Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 194 days.

(21) Appl. No.: 10/632,214

(22) Filed: Jul. 31, 2003

(65) Prior Publication Data

US 2004/0024997 A1 Feb. 5, 2004

Related U.S. Application Data

(60) Provisional application No. 60/400,391, filed on Jul. 31, 2002.

(30) Foreign Application Priority Data

Jul. 30, 2003 (EP) .................................. 03291910

(51) Int. Cl.
*G06F 9/00* (2006.01)
(52) U.S. Cl. ..................................... 712/234
(58) Field of Classification Search ............. 712/34, 712/234
See application file for complete search history.

(56) References Cited

U.S. PATENT DOCUMENTS 4,873,627 A    10/1989  Baum
5,471,593 A *  11/1995  Branigin ..................... 712/235
5,504,903 A *  4/1996   Chen et al. ................... 713/1
5,555,428 A *  9/1996   Radigan et al. .............. 712/22
5,638,525 A *  6/1997   Hammond et al. .......... 712/209
5,659,722 A *  8/1997   Blaner et al. ................ 712/234
5,815,695 A    9/1998   James
6,041,399 A *  3/2000   Terada et al. ................ 712/24
6,088,786 A *  7/2000   Feierbach et al. ........... 712/200

(Continued)

FOREIGN PATENT DOCUMENTS

EP           0079995 A1      6/1983

OTHER PUBLICATIONS

Weaver, David L., Germond, Tom. "The SPARC Architecture Manual" Version 9, pp. 63-68, 138-139, and 146-150.*

(Continued)

*Primary Examiner*—Eddie P Chan
*Assistant Examiner*—Jacob Petranek
(74) *Attorney, Agent, or Firm*—Lawrence J. Bassuk; W. James Brady; Frederick J. Telecky, Jr.

(57) ABSTRACT

A processor is disclosed herein that may execute an instruction that includes an immediate value and a reference to a register accessible to the processor. The instruction causes the processor to perform a test using the immediate value and the contents of the register referenced in the instruction. Based on the outcome of test, the subsequent instruction is executed or skipped. Further, the instruction includes at least one bit that specifies how the test is to be performed. The bit may specify that the immediate value is to be compared to the register value, or that the immediate value is used to mask the register value and the masked register value has one or more of its bits tested.

14 Claims, 3 Drawing Sheets

U.S. PATENT DOCUMENTS

| | | | |
|---|---|---|---|
| 6,098,089 A | 8/2000 | O'Connor et al. ........... | 709/104 |
| 6,115,808 A * | 9/2000 | Arora ......................... | 712/219 |
| 6,253,307 B1 * | 6/2001 | Boutaud et al. ............. | 712/209 |
| 6,567,905 B2 | 5/2003 | Otis ........................... | 711/170 |
| 6,571,260 B1 | 5/2003 | Morris ....................... | 707/206 |
| 6,826,749 B2 * | 11/2004 | Patel et al. ................. | 717/148 |
| 6,880,074 B2 * | 4/2005 | Perry et al. ................. | 712/248 |
| 6,931,632 B2 * | 8/2005 | Ramasamy et al. ......... | 717/130 |
| 2002/0065990 A1 | 5/2002 | Chauvel et al. ............. | 711/137 |
| 2002/0069332 A1 | 6/2002 | Chauvel et al. ............. | 711/144 |
| 2003/0101320 A1 | 5/2003 | Chauvel et al. ............. | 711/154 |

OTHER PUBLICATIONS

"Enterprise Systems Architecture/390 Principles of Operation" Eighth Edition (Jul. 2001). pp. 7-1, 7-17, and 7-18.*

*Embedded Java*, Vincent Perrier, Aug. 15, 2001, (3 p.); Online http://www.onjava.com/pub/a/onjava/synd/2001/08/15/embedded.html.

Search report dated Jun. 18, 2008, for European Patent Application No. 03291910.2-1243, 3 pages.

* cited by examiner

| R0 | GENERAL PURPOSE (GP) |
| --- | --- |
| R1 | GENERAL PURPOSE (GP) |
| R2 | GENERAL PURPOSE (GP) |
| R3 | GENERAL PURPOSE (GP) |
| R4 | PROGRAM COUNTER (PC) |
| R5 | GENERAL PURPOSE / LOCAL VARIABLE POINTER (LV) |
| R6 | STACK POINTER (SP) |
| R7 | TOP OF STACK (ToS) |
| R8 | GENERAL PURPOSE / ADDRESS INDEX 0 (AI0) |
| R9 | GENERAL PURPOSE / ADDRESS INDEX 1 (AI1) |
| R10 | GENERAL PURPOSE (GP) |
| R11 | GENERAL PURPOSE (GP) |
| R12 | MICRO-PROGRAM COUNTER (MICRO-PC) |
| R13 | GENERAL PURPOSE (GP) |
| R14 | GENERAL PURPOSE / INDIRECT REGISTER INDEX (IRI) |
| R15 | STATUS AND CONTROL (ST) |

STACK REGISTER REFERENCE CONTROL BIT IN SOURCE OPERAND OF INSTRUCTION

CROSS-REFERENCE TO RELATED APPLICATIONS

This application claims priority to U.S. Provisional Application Ser. No. 60/400,391 titled "JSM Protection," filed Jul. 31, 2002, incorporated herein by reference. This application also claims priority to EPO Application No. 03291927.6, filed Jul. 30, 2003 and entitled "A Multi-Processor Computing System Having A Java Stack Machine And A RISC-Based Processor," incorporated herein by reference. This application also may contain subject matter that may relate to the following commonly assigned co-pending applications incorporated herein by reference. "System And Method To Automatically Stack And Unstack Java Local Variables," Ser. No. 10/632,228, filed Jul. 31, 2003, "Memory Management Of Local Variables," Ser. No. 10/632,067, filed Jul. 31, 2003, "Memory Management Of Local Variables Upon A Change Of Context," Ser. No. 10/632,076, filed Jul. 31, 2003, "A Processor With A Split Stack," Ser. No. 10/632,079, filed Jul. 31, 2003, "Using IMPDEP2 For System Commands Related To Java Accelerator Hardware," Ser. No. 10/632,069, filed Jul. 31, 2003, "Test With Immediate And Skip Processor Instruction," Ser. No. 10/632,214, filed Jul. 31, 2003, "Test And Skip Processor Instruction Having At Least One Register Operand," Ser. No. 10/632,084, filed Jul. 31, 2003, "Synchronizing Stack Storage," Ser. No. 10/631,422, filed Jul. 31, 2003, "Methods And Apparatuses For Managing Memory," Ser. No. 10/631,252, filed Jul. 31, 2003, "Write Back Policy For Memory," Ser. No. 10/631,185, filed Jul. 31, 2003, "Methods And Apparatuses For Managing Memory," Ser. No. 10/631,205, filed Jul. 31, 2003, "Mixed Stack-Based RISC Processor," Ser. No. 10/631,308, filed Jul. 31, 2003, "Processor That Accommodates Multiple Instruction Sets And Multiple Decode Modes," Ser. No. 10/631,246, filed Jul. 31, 2003, "System To Dispatch Several Instructions On Available Hardware Resources," Ser. No. 10/631,585, filed Jul. 31, 2003, "Micro-Sequence Execution In A Processor," Ser. No. 10/632,216, filed Jul. 31, 2003, "Program Counter Adjustment Based On The Detection Of An Instruction Prefix," Ser. No. 10/632,222, filed Jul. 31, 2003, "Reformat Logic To Translate Between A Virtual Address And A Compressed Physical Address," Ser. No. 10/632,215, filed Jul. 31, 2003, "Synchronization Of Processor States," Ser. No. 10/632,024, filed Jul. 31, 2003, "Conditional Garbage Based On Monitoring To Improve Real Time Performance," Ser. No. 10/631,195, filed Jul. 31, 2003, "Inter-Processor Control," Ser. No. 10/631,120, filed Jul. 31, 2003, "Cache Coherency in A Multi-Processor System," Ser. No. 10/632,229, filed Jul. 31, 2003, and "Concurrent Task Execution In A Multi-Processor, Single Operating System Environment," Ser. No. 10/632,077, filed Jul. 31, 2003.

BACKGROUND OF THE INVENTION

1. Technical Field of the Invention

The present invention relates generally to processors and more particularly to an executable instruction that is capable of testing two values and skipping or executing the subsequent instruction based on the result of the test.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY

As disclosed herein, a processor may execute an instruction that includes an immediate value and a reference to a register accessible to the processor. The instruction causes the processor to perform a test using the immediate value and the contents of the register referenced in the instruction. Based on the outcome of test, the subsequent instruction is executed or skipped. Further, the instruction includes at least one bit that specifies how the test is to be performed. The bit may specify that the immediate value is to be compared to the register value, or that the immediate value is used to mask the register value and the masked register value has one or more of its bits tested.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections. "Skipping" an instruction means that the instruction, which may have already been fetched by the processor, is not permitted to complete through the processor's pipeline in favor of the instruction following the skipped instruction.

BRIEF DESCRIPTION OF THE DRAWINGS

For a more detailed description of the preferred embodiments of the present invention, reference will now be made to the accompanying drawings, wherein.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor that executes various instructions including, without limitation, a "test with immediate and skip" instruction. The following describes the operation of a preferred embodiment of a processor on which the test with immediate and skip instruction may run. Other processor architectures and embodiments may be available or developed on which to run the instruction and thus this disclosure and the claims which follow are not limited to any particular type of processor. Details regarding the format and operation of the test with immediate and skip instruction follow the description of the processor.

The processor described herein is particularly suited for executing Java™ Bytecodes or comparable code. As is well known, Java is particularly suited for embedded applications. Java is a relatively "dense" language meaning that on average each instruction may perform a large number of functions compared to various other programming languages. The dense nature of Java is of particular benefit for portable, battery-operated devices that preferably include as little memory as possible to save space and power. The reason, however, for executing Java code is not material to this disclosure or the claims which follow. The processor described herein may be used in a wide variety of electronic systems. By way of example and without limitation, the Java-executing processor described herein may be used in a portable, battery-operated cell phone. Further, the processor advantageously includes one or more features that permit the execution of the Java code to be accelerated.

Figure 1:
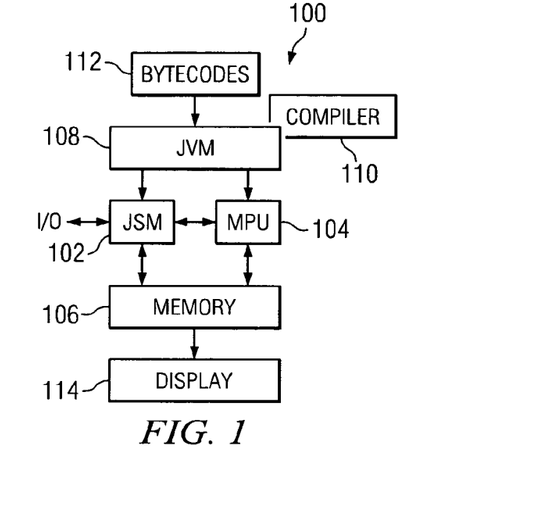
FIG. 1 shows a diagram of a system in accordance with preferred embodiments of the invention and including a Java Stack Machine ("JSM") and a Main Processor Unit ("MPU")
Figure 2:
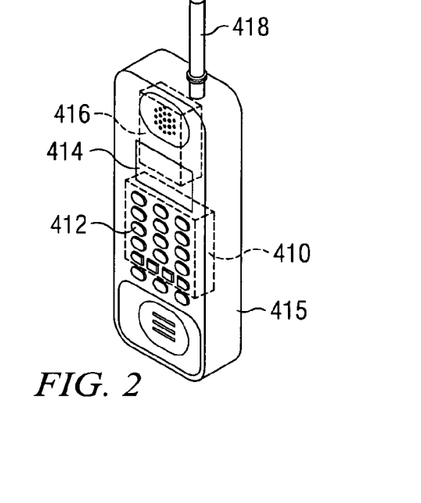
FIG. 2 illustrates an embodiment of the invention in the form of a wireless communication device.

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may include, without limitation, a battery and an analog transceiver to permit wireless communications with other devices. As noted above, while system 100 may be representative of, or adapted to, a wide variety of electronic systems, an exemplary electronic system may comprise a battery-operated, mobile cell phone such as that is shown in FIG. 2. As shown, a mobile communications device includes an integrated keypad 412 and display 414. Two processors and other components may be included in electronics package 410 connected to keypad 410, display 414, and radio frequency ("RF") circuitry 416 which may be connected to an antenna 418.

As is generally well known, Java code comprises a plurality of "bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java bytecodes. When appropriate, however, the JSM 102 may request the MPU 104 to execute one or more Java bytecodes not executed or executable by the JSM 102. In addition to executing Java bytecodes, the MPU 104 also may execute non-Java instructions. The MPU 104 also hosts an operating system ("O/S") (not specifically shown), which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, bytecode verifier, garbage collector, and a bytecode interpreter loop to interpret the bytecodes that are not executed on the JSM processor 102.

In accordance with preferred embodiments of the invention, the JSM 102 may execute at least two instruction sets. One instruction set may comprise standard Java bytecodes. As is well-known, Java is a stack-based programming language in which instructions generally target a stack. For example, an integer add ("IADD") Java instruction pops two integers off the top of the stack, adds them together, and pushes the sum back on the stack. As will be explained in more detail below, the JSM 102 comprises a stack-based architecture with various features that accelerate the execution of stack-based Java code.

Another instruction set executed by the JSM 102 may include instructions other than standard Java instructions. In accordance with at least some embodiments of the invention, such other instruction set may include register-based and memory-based operations to be performed. This other instruction set generally complements the Java instruction set and, accordingly, may be referred to as a complementary instruction set architecture ("C-ISA"). By complementary, it is meant that the execution of some more complex Java bytecodes may be substituted by "microsequences" using C-ISA instructions that permit an address calculation process to "walk through" the JVM data structures. Further, such microsequences may also use bytecode instructions. Further, Java execution may be made more efficient and run faster by replacing some sequences of Bytecodes by preferably shorter and more efficient sequences of C-ISA instructions. Bytecodes also may be used within a C-ISA sequence. The two sets of instructions may be used in a complementary fashion to obtain satisfactory code density and efficiency. As such, the JSM 102 generally comprises a stack-based architecture for efficient and accelerated execution of Java bytecodes combined with a register-based architecture for executing register and memory based CISA instructions. Both architectures preferably are tightly combined and integrated through the CISA.

Figure 3:
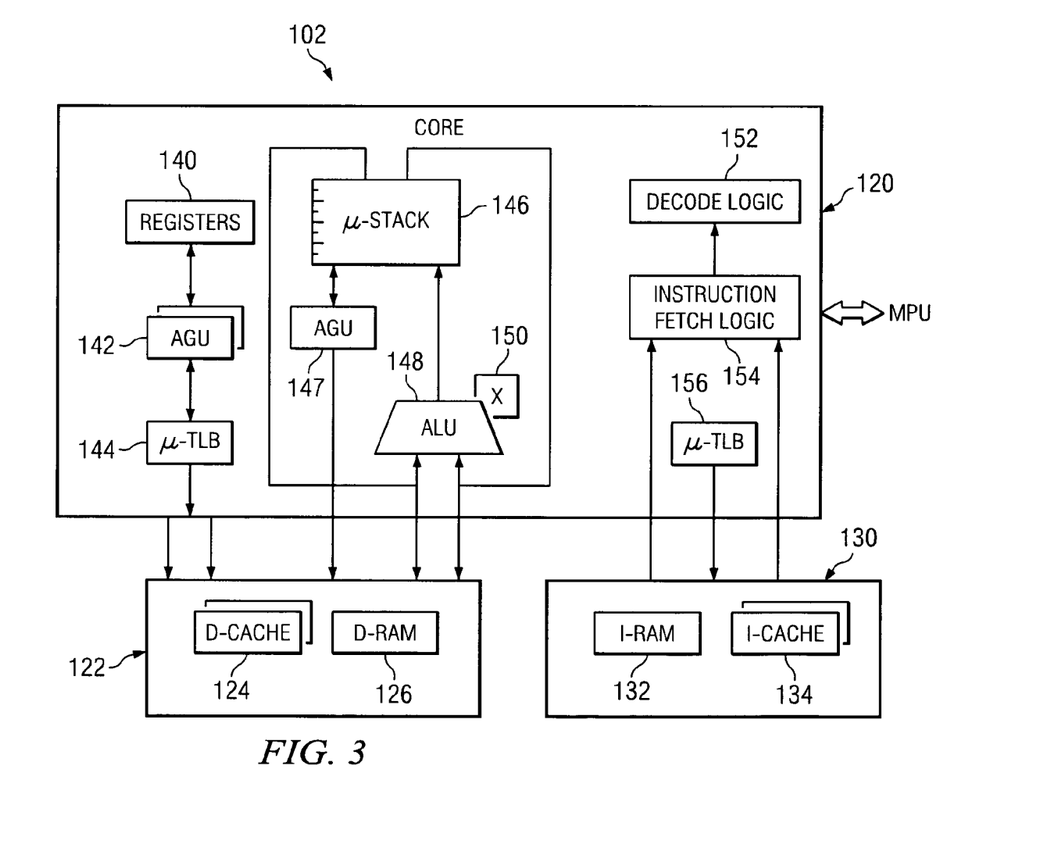
FIG. 3 shows a block diagram of the JSM of FIG. 1 in accordance with preferred embodiments of the invention.

FIG. 3 shows an exemplary block diagram of the JSM 102. As shown, the JSM includes a core 120 coupled to data storage 122 and instruction storage 130. The core may include one or more components as shown. Such components preferably include a plurality of registers 140, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146, processed by the ALU 148, while instructions may be fetched from instruction storage 130 by fetch logic 154 and decoded by decode logic 152. The address generation unit 142 may be used to calculate addresses based, at least in part on data contained in the registers 140. The AGUs 142 may calculate addresses for C-ISA instructions as will be described below. The AGUs 142 may support parallel data accesses for C-ISA instructions that perform array or other types of processing. AGU 147 couples to the micro-stack 146 and may manage overflow and underflow conditions in the micro-stack preferably in parallel. The micro-TLBs 144, 156 generally perform the function of a cache for the address translation and memory protection information bits that are preferably under the control of the operating system running on the MPU 104.

Figure 4:
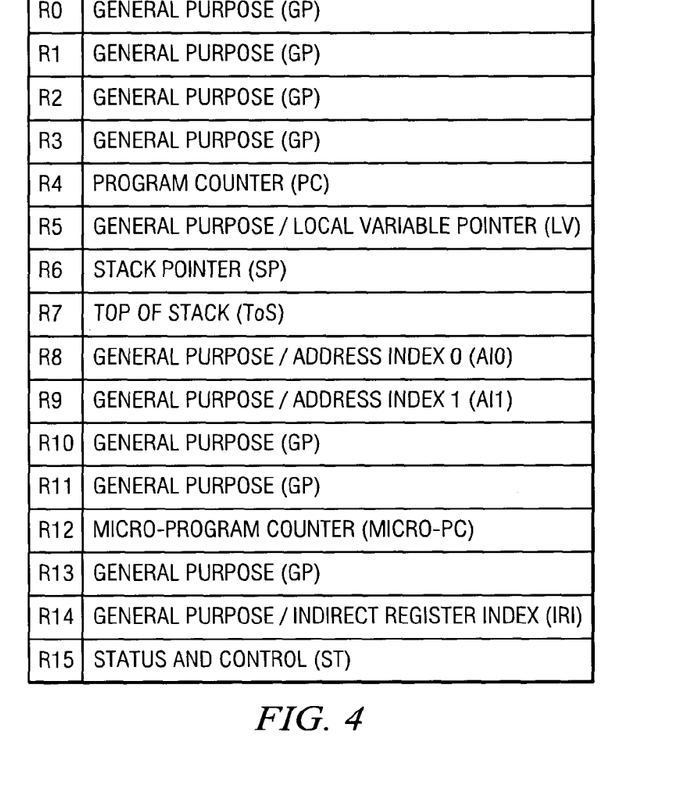
FIG. 4 shows various registers used in the JSM of FIGS. 1 and 3.

Referring now to FIG. 4, the registers 140 may include 16 registers designated as R0-R15. Registers R0-R3, R5, R8-R11 and R13-R14 may be used as general purposes ("GP") registers usable for any purpose by the programmer. Other registers, and some of the GP purpose registers, may be used for specific functions. For example, registers R4 and R12 may be used to store two program counters. Register R4 preferably is used to store the program counter ("PC") and register R12 preferably is used to store a micro-program counter ("micro-PC"). In addition to use as a GP register, register R5 may be used to store the base address of a portion of memory in which Java local variables may be stored when used by the current Java method. The top of the micro-stack 146 is reflected in registers R6 and R7. The top of the micro-stack has a matching address in external memory pointed to by register R6. The values contained in the micro-stack are the latest updated values, while their corresponding values in external memory may or may not be up to date. Register R7 provides the data value stored at the top of the micro-stack. Registers R8 and R9 may also be used to hold the address index 0 ("AI0") and address index 1 ("AI1"), as will be explained below. Register R14 may also be used to hold the indirect register index ("IR") as will also be explained below. Register R15 may be used for status and control of the JSM 102. As an example, one status/control bit (called the "Micro-Sequence-Active" bit) may indicate if the JSM 102 is executing a "simple" instruction or a "complex" instruction through a "microsequence." This bit controls in particular, which program counter is used R4 (PC) or R12 (microPC) to fetch the next instruction. A "simple" bytecode instruction is generally one in which the JSM 102 may perform an immediate operation either in a single cycle (e.g., an "iadd" instruction) or in several cycles (e.g., "dup2_x2"). A "complex" bytecode instruction is one in which several memory accesses may be required to be made within the JVM data structures for various verifications (e.g., Null pointer, array boundaries). Because these data structures are generally JVM-dependent and thus may change from one JVM implementation to another, the software flexibility of the micro-sequence provides a mechanism for various JVM optimizations now known or later developed.

Referring again to FIG. 3, as noted above, the JSM 102 is adapted to process and execute instructions from at least two instruction sets. One instruction set includes stack-based operations and the second instruction set includes register-based and memory-based operations. The stackbased instruction set may include Java bytecodes. Java bytecodes pop, unless empty, data from and push data onto the micro-stack 146. The micro-stack 146 preferably comprises the top n entries of a larger stack that is implemented in data storage 122. Although the value of n may be vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure.

The second, register-based, memory-based instruction set may comprise the C-ISA instruction set introduced above. The C-ISA instruction set preferably is complementary to the Java bytecode instruction set in that the C-ISA instructions may be used to accelerate or otherwise enhance the execution of Java bytecodes. For example, the compiler 110 may scan a series of Java bytes codes 112 and replace one or more of such bytecodes with an optimized code segment mixing C-ISA and bytecodes and which is capable of more efficiently performing the function(s) performed by the initial group of Java bytecodes. In at least this way, Java execution may be accelerated by the JSM 102. The C-ISA instruction set includes a plurality of instructions including a "test with immediate and skip" instruction as mentioned above and explained below in detail.

Referring still to FIG. 3, the ALU 148 adds, subtracts, and shifts data. The multiplier 150 may be used to multiply two values together in one or more cycles. The instruction fetch logic 154 generally fetches instructions from instruction storage 130. The instructions may be decoded by decode logic 152. Because the JSM 102 is adapted to process instructions from at least two instruction sets, the decode logic 152 generally comprises at least two modes of operation, one mode for each instruction set. As such, the decode logic unit 152 may include a Java mode in which Java instructions may be decoded and a C-ISA mode in which C-ISA instructions may be decoded.

The data storage 122 generally comprises data cache ("D-cache") 124 and data random access memory ("D-RAMset") 126. Reference may be made to copending applications U.S. Ser. No. 09/591,537 filed Jun. 9, 2000, Ser. No. 09/591,656 filed Jun. 9, 2000 (atty docket TI-29960), and Ser. No. 09/932,794 filed Aug. 17, 2001, all of which are incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAMset 132 may be used for "complex" micro-sequenced bytecodes or other micro-sequences or sequences of code, as will be described below. The I-cache 134 may be used to store other types of Java bytecode and mixed Java/CISA instructions.

Figure 5:
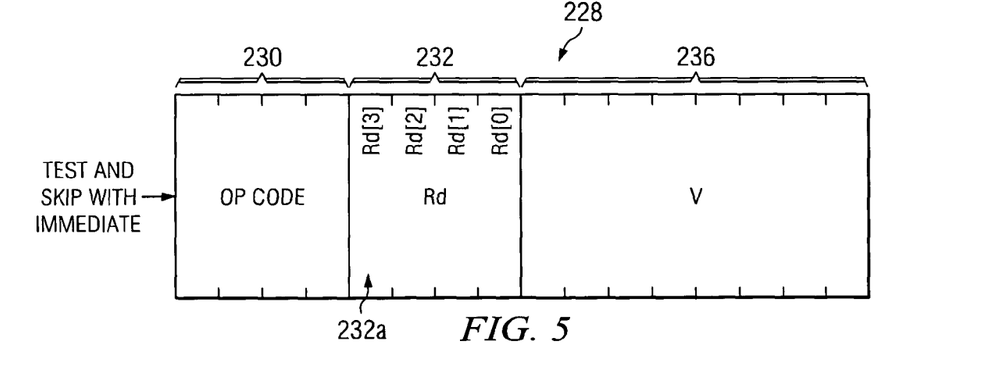
FIG. 5 shows an exemplary format of a test and skip instruction in accordance with the preferred embodiment of the invention.

As explained above, the C-ISA instruction set preferably permits register-based and memory-based operations. While not the only C-ISA instruction, as noted above one such instruction is the "test with immediate and skip" instruction. An exemplary embodiment of this instruction is depicted in FIG. 5. The preferred embodiment of the test and skip with immediate instruction comprises an opcode 230, a reference 232 to a register (labeled generically as "Rd" in FIG. 5), and an immediate value V 236. The immediate value may have any suitable format such as an eight-bit signed value.

The test with immediate and skip instruction 228 in FIG. 5 generally operates in one of at least two modes depending on the state of at least one bit in register reference Rd 232. The Rd reference in FIG. 5 preferably includes four bits (Rd) with Rd being the most significant bit and occupying bit location 232a. The modes preferably are determined by the most significant bit Rd. In some embodiments one mode is specified when Rd is a logic "0", while another mode is specified when Rd is a "1". In the former mode, Rd 232 references one of the registers from R0-R7, while in the latter mode, Rd references R8-R15. In other embodiments, a logic "1" for Rd may specify the former mode and a logic "0" for Rd may specify the latter mode, or a bit besides Rd could be used to specify the mode.

In accordance with the preferred embodiment, as noted above when Rd is a 0, the register Rd 232 encodes one of a first group of registers, preferably registers R0-R7 in FIG. 4. If the immediate value V does not match the contents of the eight lower bits of the register referenced by Rd, then the instruction that follows the test and skip instruction 228 is "skipped" or is not executed. Skipping the next instruction means that the subsequent instruction, which may have already been fetched by fetch logic 154, is not permitted to complete through the processor's pipeline. Skipping the subsequent instruction may occur by replacing the instruction with a "no operation" (NOP) instruction which is permitted to complete but, by its nature, generally does nothing. Skipping the subsequent instruction may be performed other ways as well, such as by flushing the subsequent from the processor's pipeline.

If, however, value V matches the contents of register Rd, then the subsequent instruction is executed, and thus not skipped. The combination of various logic including, without limitation, the decode logic 152 and/or fetch logic 154 may be used to perform the instruction replacement as described above. Further, the comparison of immediate value V with the contents of Rd may be performed by any suitable logic in the processor core 120 such as the ALU 148. The comparison preferably comprises a bit-by-bit comparison between V and the contents of Rd. If desired, a bit in the status register R15 may be written to reflect the result of the comparison. For example, this status bit may be written as a "0" if V does not match the contents of Rd or as a "1" if there is a match.

The test with immediate and skip instruction avoids having to use a register to store the immediate value which may be helpful in cores having a limited number of registers. Further, the instruction described herein avoids having to load the immediate value from memory, thereby reducing the instruction count.

If Rd is a logic 1, register reference Rd 232 encodes one of a second group of registers, preferably registers R8-R15. In this mode, the processor 102 generally examines the state of one or more bits, but not necessarily all bits, in register Rd. As such, the immediate value V is used to mask the contents of register Rd 232. This may be accomplished in the preferred embodiment by logically AND'ing register Rd with the immediate value V on a bit-by-bit basis. The mask (immediate value V) may comprise 0's in the bit places that are not of interest, and 1's in the bit places that are of interest. Once the contents of register Rd 232 are masked, the bits corresponding to the bit positions of the mask having a 1 are examined to determine whether they are a 0 or a 1. If the contents of register Rd, after masking, are not all 0's, then the next instruction following the test and skip instruction 228 is skipped as described above. If, however, the masked register Rd is all 0's, the subsequent instruction is executed and not skipped.

Targeting registers R8-R15 may be particularly appropriate for testing individual bits of the status register (e.g., the eight lower bits) and for jumping to a specific routine if one of those bits is set or continue to run another routine if not set. In the JSM architecture, some of these lower status bit may be used (set/cleared) by the MPU 104 to dynamically change the behavior of JSM 102. When one of these status bit is set to "1", the micro-sequence executing complex bytecodes may behave differently than when the same status bit is set to "0".

The format shown in FIG. 5 is directed to a 16-bit instruction. Other embodiments of the test with immediate and skip instruction may include a different number of bits and/or a different number of bits for each of the fields shown in FIG. 5. In some embodiments, the Rd[3] bit functionality may be replaced by the detection of a specific Rd field 232 value to target only a particular register (e.g., the status register $R_{15}$). Further, in some embodiments, the C bit 234 may be eliminated and two different opcodes 230 could be used to specify the different testing paradigms.

Figure 6:
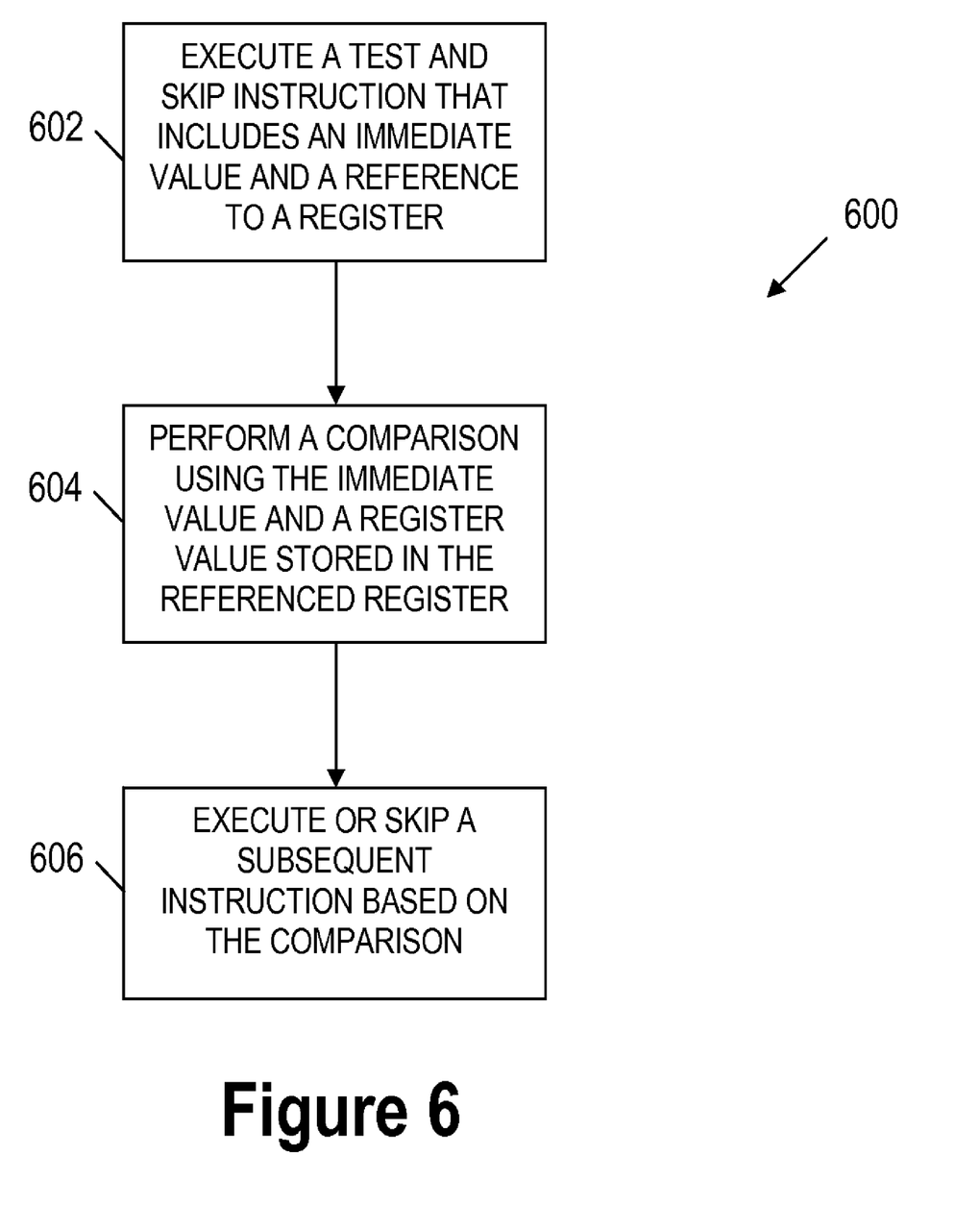
FIG. 6 shows a method in accordance with embodiments of the invention.

FIG. 6 shows a method 600 in accordance with embodiments of the invention. As shown in FIG. 6, the method 600 comprises executing a test and skip instruction that includes an immediate value and a reference to a register (block 602). The method 600 then comprises performing a comparison using the immediate value and a register value stored in the referenced register (block 604). Finally, the method 600 comprises executing or skipping a subsequent instruction based on the comparison (block 606).

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A processor executing a plurality of instructions, comprising:
   an arithmetic logic unit (ALU); and
   a plurality of registers coupled to the ALU, each register programmable to store a register value;
   wherein said processor executes a routine having a test and skip instruction defined by an opcode, said test and skip instruction includes an immediate value and a register reference control bit contained within a source operand of the test and skip instruction, the test and skip instruction performs a comparison using the immediate value and the register value stored in the register referenced by the register reference control bit, and selectively skips a subsequent instruction that follows the test and skip instruction based on the comparison;
   wherein the register reference control bit specifies whether the register reference is to a register from a first group of registers or to a register from a second group of registers, and if a register from the first group of registers is specified by said register reference control bit, the comparison is performed by comparing the immediate value to the register value, and, if a register from the second group of registers is specified by said at least one register reference control bit, the comparison is performed by masking the register value with the immediate value and examining one or more bits in a masked version of the referenced register; and wherein the subsequent instruction jumps to another routine.

2. The processor of claim 1 wherein, if comparing the immediate value to the register value, the processor skips the subsequent instruction if the immediate value does not match the register value and executes the subsequent if the immediate value does match the register value.

3. The processor of claim 1 wherein, if masking the register value, the masking is performed by ANDing the immediate value with the register value.

4. The processor of claim 1 wherein the plurality of registers include a status register and if the register reference specified by said at least one bit is not the status register, the comparison is performed by comparing the immediate value to the register value in the referenced register, and, if the register reference specified by said at least one bit is the status register, the comparison is performed by masking the register value in the status register with the immediate value and examining one or more bits in a masked version of the status register.

5. The processor of claim 1 wherein, if masking the register value, the processor skips the subsequent instruction if the masked version of the register value comprises all logic high values or all logic low values, and executes the subsequent instruction if the masked version comprises a mix of logic high and low values.

6. A method of executing an instruction defined by an opcode, an immediate value, and a register reference control bit that dictates one of at least two tests, the method comprising:
examining said register reference control bit contained within a source operand of the instruction to determine its state;
if said register reference control bit is in a first state, comparing the immediate value to the contents of a register in a first group of registers and skipping a subsequent instruction based on an outcome of the comparison; or
if said register reference control bit is in a second state, masking the contents of a register in a second group of registers with the immediate value, testing one or more bits in the masked version of the contents of the register, and skipping a subsequent instruction based on an outcome of the testing; and
wherein said register reference control bit is outside said opcode.

7. The method of claim 6 wherein skipping the subsequent instruction comprises replacing the subsequent instruction with a no operation instruction.

8. A system, comprising:
a main processor unit; and
a co-processor coupled to said main processor unit, wherein said co-processor selectively operates in a stack-based instruction mode and a register-based instruction mode,
wherein, during the register-based instruction mode, the co-processor executes an instruction defined by an opcode and including an immediate value and a reference to a register accessible to said co-processor, performs a comparison using the immediate value and a register value, and executes or skips a subsequent instruction based on the comparison; and
wherein the instruction includes at least one register reference control bit contained within a source operand of the instruction, separate from said opcode, that specifies whether the register reference is to a register from a first group of registers or to a register from a second group of registers, and if a register from the first group of registers is specified by said at least one register reference control bit, the comparison is performed by comparing the immediate value to the register value, and, if a register from the second group of registers is specified by said at least one register reference control bit, the comparison is performed by masking the register value with the immediate value and examining one or more bits in a masked version of the referenced register.

9. The system of claim 8 wherein, if comparing the immediate value to the register value, the co-processor does not execute the subsequent instruction if the immediate value does not match the register value and executes the subsequent if the immediate value does match the register value.

10. The system of claim 8 wherein, if masking the register value, the masking is performed by ANDing the immediate value with the register value.

11. The system of claim 8 further comprising wireless communication circuitry and said system comprises a cell phone.

12. The system of claim 8 wherein, if masking the register value, the processor skips the subsequent instruction if the masked version of the register value comprises all logic high values or all logic low values, and executes the subsequent instruction if the masked version comprises a mix of logic high and low values.

13. A programmable logic device comprising;
control logic;
means for selectively changing an operating mode of the programmable logic device; and
means for decoding a register reference control bit contained within a source operand in an instruction that includes an immediate value and a reference to a register, for performing a comparison using the immediate value and a register value stored in the referenced register, and for causing the programmable logic device to execute or not execute a subsequent instruction that follows the instruction based on the comparison;
wherein said register reference control bit selectively specifies whether the comparison is to be performed by comparing the immediate value to the register value or whether the comparison is to be performed by masking the register value with the immediate value and examining one or more bits in a masked version of the referenced register; and wherein the subsequent instruction jumps to a routine associated with a particular operating mode;
wherein said register reference control bit is separate from an opcode that defines said instruction.

14. The programmable logic device of claim 13 including means for comparing the immediate value to the register value in the referenced register.

* * * * *

UNITED STATES PATENT AND TRADEMARK OFFICE
CERTIFICATE OF CORRECTION

PATENT NO. : 7,634,643 B2
APPLICATION NO. : 10/632214
DATED : December 15, 2009
INVENTOR(S) : Chauvel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 319 days.

Signed and Sealed this

Ninth Day of November, 2010

David J. Kappos
*Director of the United States Patent and Trademark Office*